United States Patent
Jayasuriya et al.

(10) Patent No.: US 7,978,871 B2
(45) Date of Patent: Jul. 12, 2011

(54) SPEAKER SYSTEM FOR A VEHICLE

(75) Inventors: A. Mangala M. Jayasuriya, Bloomfield Hills, MI (US); Brian Spahn, Plymouth, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1209 days.

(21) Appl. No.: 11/614,201

(22) Filed: Dec. 21, 2006

(65) Prior Publication Data

US 2008/0150324 A1   Jun. 26, 2008

(51) Int. Cl.
*H04R 1/00* (2006.01)
*H04R 1/02* (2006.01)

(52) U.S. Cl. .......................................... 381/389; 381/86

(58) Field of Classification Search .................. 381/302, 381/86, 87, 365, 386, 389, 395; 181/148, 181/150

See application file for complete search history.

(56) References Cited

U.S. PATENT DOCUMENTS

| 4,281,224 | A * | 7/1981 | Castagna ...................... 381/391 |
| 6,205,714 | B1 | 3/2001 | Staser et al. |
| 6,543,838 | B1 | 4/2003 | Bertolini et al. |
| 6,955,391 | B1 | 10/2005 | Peng |
| 7,014,249 | B2 | 3/2006 | Karuppaswamy et al. |
| 2003/0075381 | A1 | 4/2003 | Abdo |
| 2004/0037445 | A1 | 2/2004 | Kirihara et al. |
| 2004/0247150 | A1 | 12/2004 | Iwaya et al. |

FOREIGN PATENT DOCUMENTS

| JP | 10203254 | 8/1998 |
| JP | 2001119791 A | 4/2001 |

* cited by examiner

*Primary Examiner* — Tuan D Nguyen
(74) *Attorney, Agent, or Firm* — Frank A. MacKenzie; Brooks Kushman P.C.

(57) ABSTRACT

In response to an applied force, a speaker system is configured to deploy from a confined area so as to function as a pelvis pusher. Additionally, portions of the speaker system are configured to collapse upon the application of the force so as to absorb the force.

20 Claims, 4 Drawing Sheets

SPEAKER SYSTEM FOR A VEHICLE

TECHNICAL FIELD

The embodiments described herein generally relate to a speaker system for a vehicle.

BACKGROUND

Due to safety concerns and governmental regulations, vehicle doors are designed to mitigate the effects of side impact events. During a side impact event, it is possible for the thorax and abdomen area of an occupant to be placed under an undesirable amount of pressure. To reduce the effects of side impacts, the doors on conventional vehicles may include foam objects or blocks that function as pelvis pushers or bolsters. The pelvis pusher blocks interact with portions of the occupant's pelvic area and help to push the occupant to reduce pressure and minimize undesirable contact with the intruding door. The addition of the pelvis pusher blocks requires additional packaging considerations, impacts door trim usage and vehicle costs. Accordingly, it is desirable to utilize existing door components/devices (e.g., door speakers) that function in their intended manner while being able to function as a safety device (e.g., a pelvis pusher) during impact event.

The embodiments described herein were conceived in view of these and other concerns related to side impact events.

SUMMARY

The embodiments described herein include a speaker system for a vehicle. One embodiment of a speaker system includes a speaker frame configured to collapse upon the application of a predetermined force so as to absorb at least a portion of the impact caused by the predetermined force. A diaphragm is attached to the frame. Additionally, a magnetic assembly may be included that is attached to the frame for directing the applied predetermined force in the direction of the frame causing deployment of the speaker system.

BRIEF DESCRIPTION OF THE DRAWINGS

The novel features of the described embodiments are set forth with particularity in the appended claims. These embodiments, both as to their organization and manner of operation, together with further advantages thereof, may be best understood with reference to the following description, taken in connection with the accompanying drawings in which:

DETAILED DESCRIPTION OF THE EMBODIMENT(S)

As required, detailed descriptions of embodiments are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific functional details disclosed herein are not to be interpreted as limiting, but merely as a representative basis for the claims and/or as a representative basis for teaching one skilled in the art.

Figure 1:
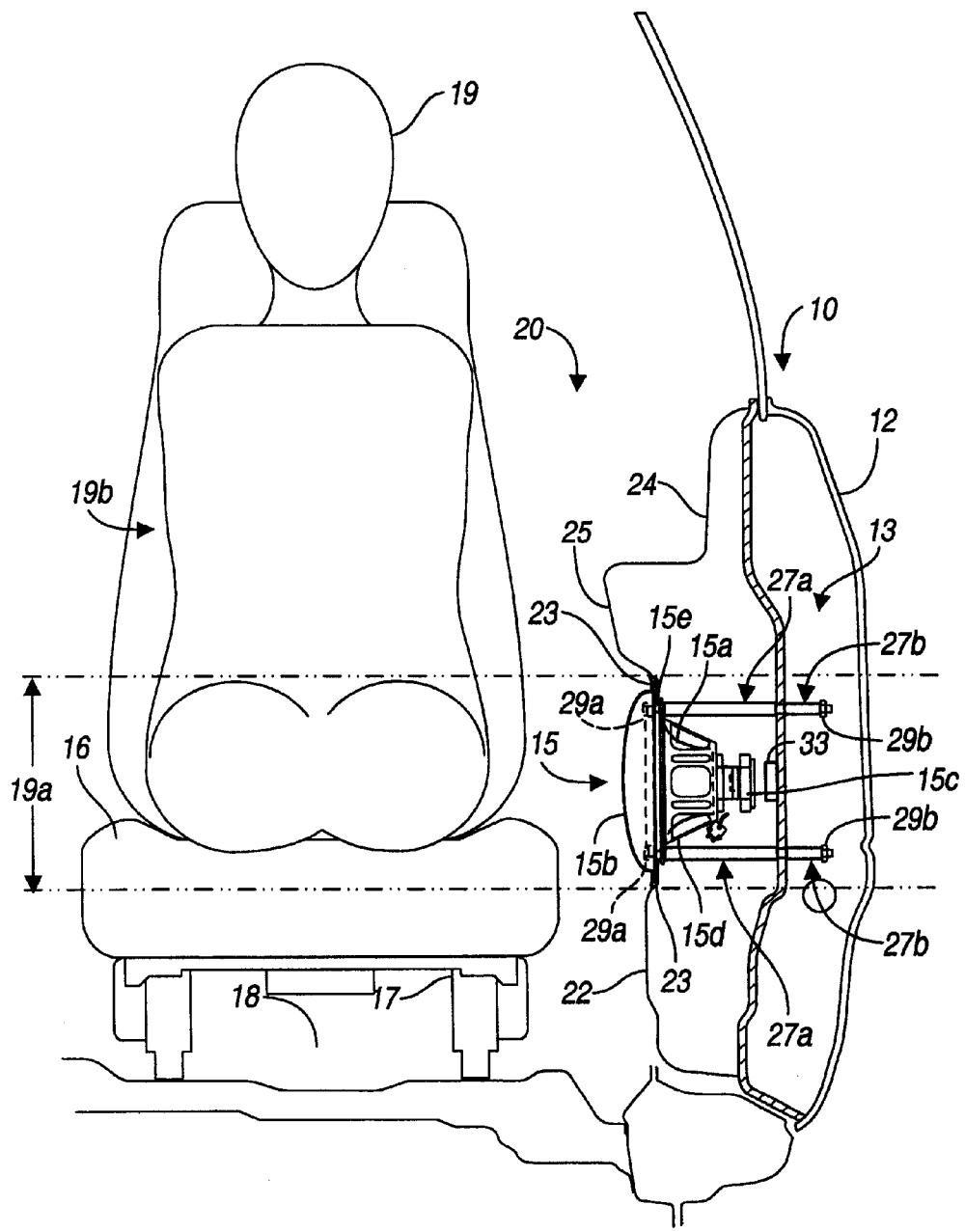
FIG. 1 illustrates a door system having a speaker system in accordance with an embodiment of the present invention.

Referring to FIG. 1, a vehicle energy absorbing side door structure system having a collapsible speaker system is shown. The door structure 10 includes an outer door panel or exterior side 12. On the interior side of the door 10, a door trim 20 may provide a decorative or an aesthetically pleasing appearance to the interior of the vehicle. The interior door trim 20 includes a lower portion 22 and an upper portion 24 having an arm rest 25 positioned at a conventional and convenient location for use thereof by an occupant 19. Adjacent to side door 10, the occupant 19 sits in a seat 16. Seat 16 is supported on a seat frame 17 above the floor 18 of the vehicle.

A speaker system 15 is located internally to door structure 10. Upon impact by a force to door 10, speaker system 15 is configured to move inwardly toward a pelvis region 19a of occupant 19 so as to function as a pelvis pusher. A pusher device 33 being formed of a metallic or any rigid material may be mounted within door 10 in alignment with speaker system 15 to expedite inward movement of speaker system 15. Specifically, during an impact event pusher device 33 engages magnetic assembly 15c so as to cause inward movement of speaker system 15 towards pelvis area/region 19a. It is recognized, however, that pusher device 33 is optional and may not be implemented with alternative embodiments. Interior door trim 20 may be formed with a weakened seam area 23 that permits the speaker 15 to move or deploy through door trim 20 in response to an impact force.

Figure 3:
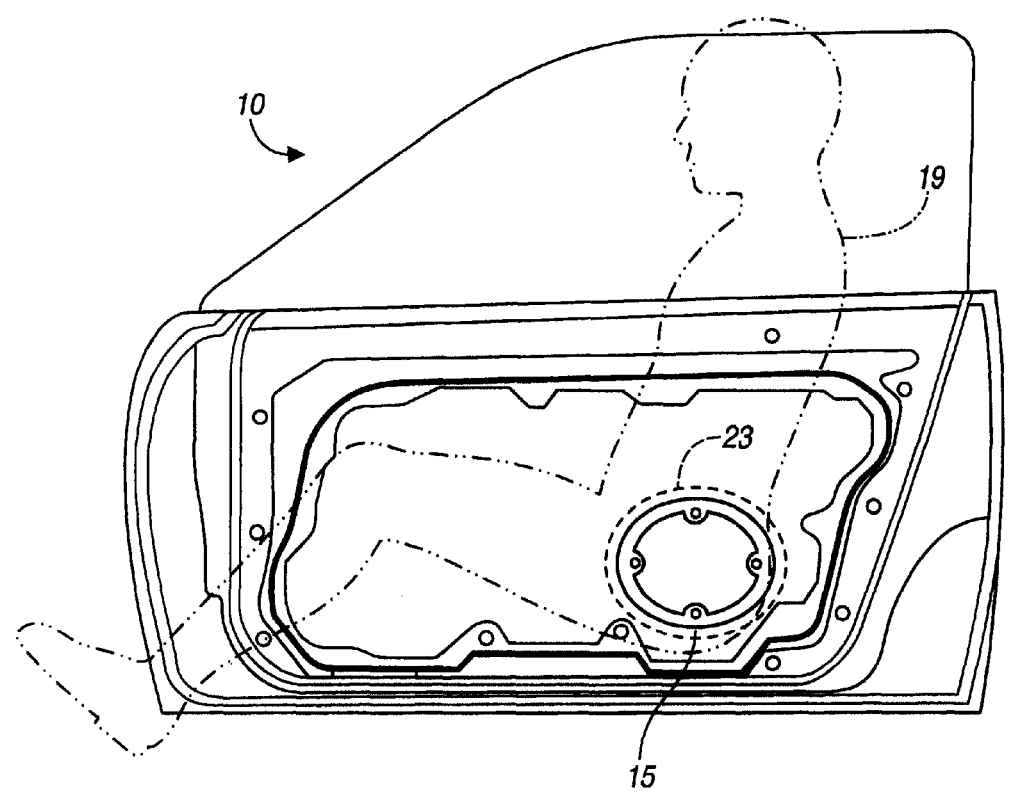
FIG. 3 illustrates a side view of a vehicle door having a speaker system in accordance with an embodiment of the present invention.

FIG. 3 illustrates a side view of door 10, speaker system 15 and seam 23. As shown in this embodiment, seam 23 forms a pattern that follows the outer perimeter of speaker system 15, yet being slightly larger than the outer perimeter of speaker system 15. In alternative embodiments, seam 23 may form patterns that differ from the outer perimeter of speaker system 15, yet allowing deployment of speaker system 15. Accordingly, the present invention contemplates alternative shapes than those illustrated for the outer perimeter of speaker system 15 and seam 23 without departing from the scope of the present invention.

Figure 2A:
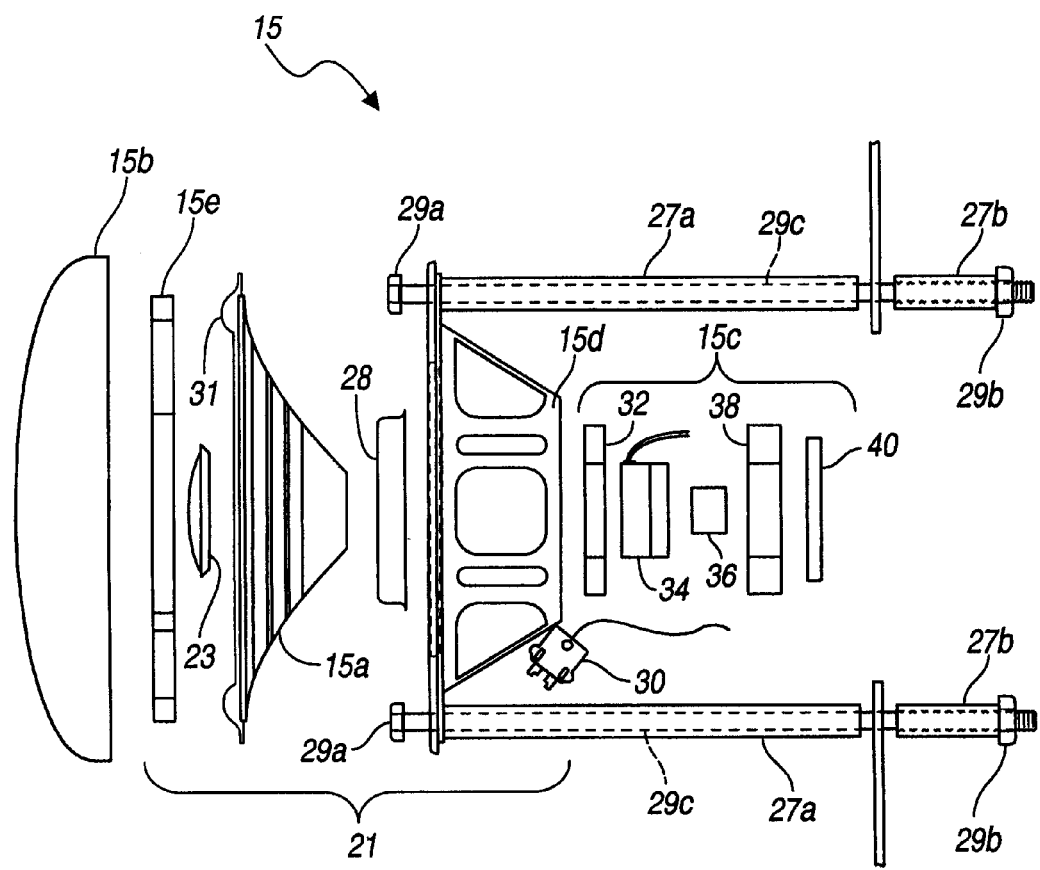
FIGS. 2A and 2B illustrate exploded views of speaker systems in accordance with embodiments of the present invention.
Figure 2B:
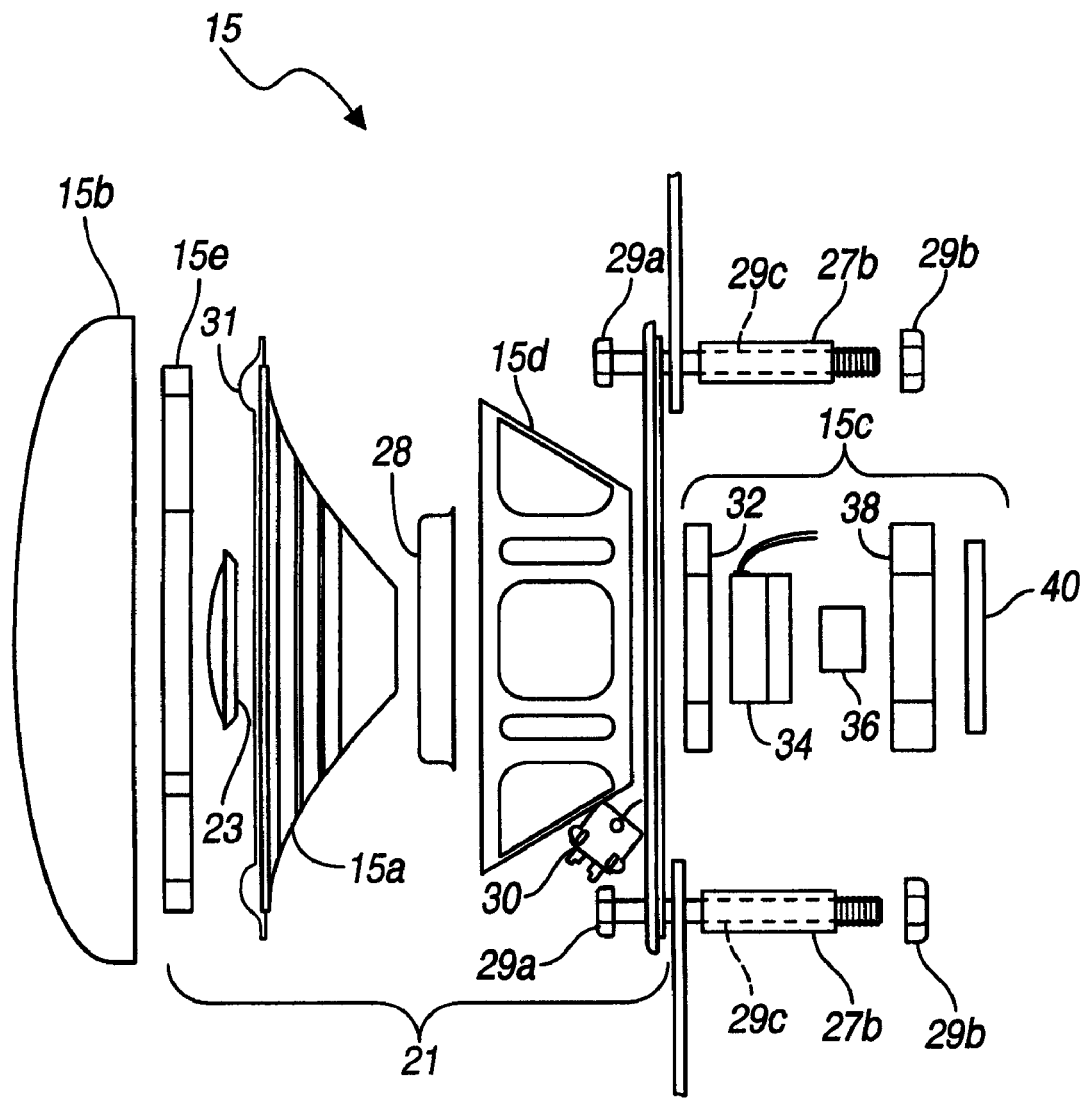

Referring to FIGS. 1, 2A and 2B, speaker system 15 includes a diaphragm 15a, a grill cover 15b, a magnetic assembly 15c, a frame 15d, and a damping ring or absorption device 15e. Speaker system 15 may be attached to door 10 through the use of a bolt/nut connection 29. As shown, a shaft 29c of the bolt 29a is surrounded by sleeves 27a and 27b (FIG. 2A). Sleeves 27a and 27b may be constructed of a rigid, yet brittle material (e.g., a plastic or ceramic material). In some embodiments (FIG. 2B), a speaker front plate 32 can be mounted on the inside of a door (commonly referred to as the "door inner") through the use of bolts absent sleeves 27a. In others embodiments (e.g., FIG. 2A), sleeves 27a may be included to function as a spacer when the speaker 15 is mounted from a front edge of the frame to the door inner. As such, sleeves 27a help secure the speaker system 15 along bolts 29a.

Sleeves 27b may be configured to break and separate from the bolts 29a when a sufficient impact force is applied to speaker system 15 via door 10. During an impact event, the applied force would push speaker system inward causing sleeve 27b to collapse while bolt 29a remains connected to speaker system 15 and door 10. Separating of sleeve 27b from bolt 29a allows speaker system 15 to slide inwardly on or traverse the shaft portion 29c. Accordingly, inward movement of speaker system 15 is guided by the secured bolt/nut connection 29. Furthermore, as described hereinafter, to further absorb impact forces, components of speaker system 15 are configured to collapse upon the application of a predetermined force as speaker system 15 enters pelvis area 19a.

As recognized by one of ordinary skill in the art, during normal operation, magnetic assembly 15c is configured to receive electrical signals that cause movement of diaphragm 15a so as to produce sound. In one embodiment, magnetic assembly 15c is mounted to the door inner of door 10. Accordingly, upon the application of a force to door 10, magnetic assembly 15c directs the applied force throughout the remaining portions of speaker system 15 so as to cause deployment of speaker 15. Magnetic assembly 15c is attached to frame 15d in a known manner.

Frame 15d is configured to collapse in a controlled manner upon the application of certain forces. For example, in one embodiment, the application of force in a range of 4 kilo-Newtons (kN) to 6 kilo-Newtons (kN) causes the speaker frame 15d to collapse upon contact with object within pelvis area 19a after inward movement of speaker system 15. It is recognized that the specific range of forces may vary depending upon design requirements without departing from the scope of present invention. Diaphragm 15a may be attached to frame 15d through the use of a suspension surround 31. As recognized by one of ordinary skill in the art, suspension surround 31 enables movement of the diaphragm 15a in reference to frame 15d as sound is produced by speaker system 15.

Absorption device 15e is positionable about frame 15d and is configured to dampen the effects of resonance created by the speaker system 15 during operation. Additionally, absorption device 15e may be configured to absorb energy transferred from the door 10 during impact events. In one embodiment, absorption device 15e is designed to enable speaker system 15 to meet load, intrusion and velocity requirements.

Frame 15d may be formed of a polymer composite or metallic alloy material. It is recognized, however, that frame 15d may be configured of other materials without departing from the scope of the present invention.

Grill cover 15b is attached to the interior side 20. Grill cover 15b may be part of the door trim that is cast integrated as a single trim panel. Grill cover 15b along with the speaker system 15 has a predetermined stiffness so as to operate as a pelvis pusher upon the application of force to exterior side 12. In some instances, grill cover 15b may be configured to collapse when contact with objects in the pelvis area occurs. Accordingly, grill cover 15b may be formed of a light-weight plastic, steel, composite material, and the like.

Now, referring specifically to FIGS. 2A and 2B, an exploded view of speaker system 15 is shown in accordance with an embodiment of the present invention. As shown, speaker system 15 includes magnetic assembly 15c and a collapsible portion 21. Magnetic assembly 15c includes a voice coil 34, a magnetic core 36 and a magnet 38. In some embodiments, a fixed coil may replace magnet 38. Voice coil 34, core 36, and magnet 38 are held together as a unit by front or top plate 32 and a back plate 40. As described in the foregoing, magnetic assembly 15c may be mounted to the door inner sheet metal so as to transfer some of the load to speaker system from the door outer panel 12 during an impact event.

Crushable portion 21 includes frame 15d having a terminal 30, diaphragm 15a, a spider 28, which suspends the diaphragm 15a, a dust cap 23 and absorption device 15e. As described above, frame 15d is configured to collapse in a controlled manner by collapsing upon the application of forces within a certain impact range. Alternative embodiments may have differing ranges in which frame 15d may collapse without departing from the scope of the present invention.

Dust cap 23 may be disposed at a center of diaphragm of 15a and prohibit the entrance of contaminants into speaker system 15. Absorption device 15e, as described in the foregoing, dampens the resonance created by sound frequencies. Absorption device 15e may be formed of a foam material and serve as a covering around the speaker frame to absorb some of the energy from the impact events. Additionally, grill cover 15b is configured to detach from its surrounding and has a predetermined stiffness to function as a pelvis pusher during impact events.

While the best mode for carrying out the invention has been described in detail, those familiar with the art to which this invention relates will recognize various alternative designs and embodiments for practicing the invention as defined by the following claims.

What is claimed:

1. A speaker system comprising:
   a frame configured to collapse upon the application of a predetermined force to the frame so as to absorb at least a portion of the impact caused by the predetermined force; and
   a magnetic assembly being attached to the frame, the magnetic assembly being configured to direct the predetermined force in the direction of the frame causing deployment of the speaker system.

2. The system of claim 1, wherein the predetermined force includes a force in a range of 4 kN to 6 kN.

3. The system of claim 1, further comprising an absorption device positionable about the frame, the absorption device being configured to dampen the effects of resonance created by the speaker system and absorb at least a portion of the predetermined force.

4. The system of claim 1, further comprising a grill cover being attached to the frame and having a predetermined stiffness for operating as a pelvis pusher upon the application of the predetermined force.

5. The system of claim 1, wherein the magnetic assembly includes a top plate, a voice coil, and a magnet.

6. The system of claim 5, wherein the magnetic assembly further includes a backplate.

7. The system of claim 1, wherein the frame is formed of a polymer composite material or metallic alloy.

8. The system of claim 1, wherein the speaker system is attached to a vehicle door through the use of at least one bolt and a nut; and
   wherein the speaker system deploys from the vehicle door by traversing a shaft of the bolt upon the application of the predetermined force.

9. The system of claim 8, further comprising a pusher device being mounted within the door in alignment with the speaker system so as to contact and cause deployment of the speaker system in response to the applied predetermined force.

10. The system of claim 8, wherein the at least one bolt is encased in one or more sleeves that are configured to break and separate from the at least one bolt upon the application of the predetermined force allowing the speaker system to traverse the shaft of the bolt.

11. The system of claim 8, wherein the speaker system is attached to the vehicle door at least at a door trim, the door trim having a seam formed generally around an outer perimeter of the speaker system facilitating deployment of the speaker system through the door trim upon the application of the predetermined force.

12. A speaker system being attached to a vehicle door, wherein the speaker system is deployable from the door upon the application of a predetermined force, the system comprising:
- a frame configured to collapse upon the application of the predetermined force;
- a magnetic assembly being attached to the frame for distributing the force throughout the speaker system;
- wherein the speaker system is attached to the vehicle door through the use of at least one bolt and a nut; and
- wherein the speaker system traverses a shaft of the bolt while being deployed from the vehicle door.

13. The system of claim 12, wherein the at least one bolt is encased in one or more sleeves that are configured to break and separate from the at least one bolt upon the application of the predetermined force allowing the speaker system to traverse the shaft of the bolt.

14. The system of claim 13, further comprising an absorption device positionable about the frame, the absorption device being configured to dampen the effects of resonance created by the speaker system and absorb the predetermined force.

15. The system of claim 14, further comprising a grill cover being attached to the frame and having a predetermined stiffness for operating as a pelvis pusher upon the application of the predetermined force.

16. The system of claim 12, wherein the speaker system is attached to the vehicle door at least at a door trim, the door trim having a seam formed generally around an outer perimeter of the speaker system facilitating deployment of the speaker system through the door trim upon the application of the predetermined force.

17. A speaker system for a vehicle having at least one door, wherein the door has interior trim side and an exterior side, the system comprising:
- a frame constructed of a polymer composite or metallic alloy material and having a first side and a second side wherein the first side is positioned about the interior trim side within a pelvis area, the frame being configured to collapse upon the application of a predetermined force to the frame;
- an absorption device being disposed between the first side of the frame and the interior trim side, the absorption device being configured to dampen the effects of resonance created by the speaker system;
- a diaphragm being attached to the first side of the frame;
- a grill cover being attached to the interior side and having a predetermined stiffness for operating as a pelvis pusher upon the application of the predetermined force; and
- a magnetic assembly being attached to the second side of the frame, the magnetic assembly being configured to direct the predetermined force in the direction of the frame causing deployment of the speaker system through the interior trim side.

18. The system of claim 17, wherein the speaker system is attached to the vehicle door through the use of at least one bolt and a nut; and
- wherein the speaker system deploys from the vehicle door by traversing a shaft of the bolt upon the application of the predetermined force.

19. The system of claim 18, further comprising at least one sleeve that surrounds the shaft of the bolt to position the speaker system about the bolt, the sleeve being configured to collapse upon the application of the force to allow the speaker system to traverse the shaft.

20. The system of claim 18, wherein the speaker system is attached to the vehicle door at least at the interior trim side, the interior trim side having a seam formed generally around an outer perimeter of the speaker system that breaks upon the application of the predetermined force to the speaker system to facilitate deployment of the speaker system through the interior trim side of the vehicle door.

* * * * *